United States Patent [19]

Iori et al.

[11] Patent Number: 6,103,301
[45] Date of Patent: Aug. 15, 2000

[54] METHOD AND LIQUID COMPOSITION FOR MARKING SUBSTRATES MADE OF PLASTICS MATERIAL

[75] Inventors: Giuseppe Iori, Reggio Emilia; Giancarlo Albanesi, Milan; Paolo Baiocchi, Parma, all of Italy

[73] Assignee: Intercast Europe S.p.A., Parma, Italy

[21] Appl. No.: 09/051,861

[22] PCT Filed: Oct. 16, 1996

[86] PCT No.: PCT/EP96/04489

§ 371 Date: Nov. 27, 1998

§ 102(e) Date: Nov. 27, 1998

[87] PCT Pub. No.: WO97/15452

PCT Pub. Date: May 1, 1997

[30] Foreign Application Priority Data

Oct. 23, 1995 [IT] Italy ................................. MI95A2187

[51] Int. Cl.$^7$ ................. B05D 5/06; B05D 7/02
[52] U.S. Cl. ............ 427/145; 427/282; 427/353; 427/384; 106/19 R; 351/159; 351/160 R
[58] Field of Search .................. 427/145, 384, 427/282, 353; 351/159, 160 R; 106/19 R, 19 A

[56] References Cited

U.S. PATENT DOCUMENTS 4,238,524 12/1980 LaLiberte et al. ................. 427/145
5,196,243 3/1993 Kawashima .......................... 428/29

FOREIGN PATENT DOCUMENTS

| 0031633 | 7/1981 | European Pat. Off. . |
| 2537058 | 6/1984 | France . |
| 3-107121 | 5/1991 | Japan . |
| WO9004004 | 9/1989 | WIPO . |

*Primary Examiner*—Erma Cameron
*Attorney, Agent, or Firm*—Sughrue, Mion, Zinn, Macpeak & Seas, PLLC

[57] ABSTRACT

A method of forming a mark on a substrate made of plastics material comprises the step of applying a basic solution to a surface portion having a prefixed pattern of the substrate. In a preferred embodiment, the basic solution is used in combination with at least one alkali-stable water-soluble polymer, to produce a viscous liquid composition, which is advantageously applicable to the substrate by means of pad-printing and silk-screen printing process.

14 Claims, No Drawings

METHOD AND LIQUID COMPOSITION FOR MARKING SUBSTRATES MADE OF PLASTICS MATERIAL

This is the national stage of International Application No. PCT/EP96/04489, filed Oct. 16, 1996.

TECHNICAL FIELD

The present invention relates to a method and liquid composition for marking on the surface of a substrate made of plastics material indicia such as, for example, a logo or a mark, not visible under normal use conditions.

In the following description and in the appended claims, the terms: substrate made of plastics material, are used to indicate any substrate, either transparent or opaque, comprising polymer chains susceptible of hydrolytic attack, with formation of hydrophilic groups, such as for instance —OH or —COO$^-$Na$^+$ groups.

For the purposes of the invention, such definition also includes substrates made of plastics material comprising a covering film, for instance an anti-scratch film, including polymer chains susceptible of hydrolytic attack, such as for example alkoxy silanes.

The method and the liquid composition of the invention also have a preferred—even though non exclusive—use to form patterns on the surface of ophthalmic and non ophthalmic sun-glasses lenses, visors, sheets, protection screens, etc., made using said substrates.

BACKGROUND ART

As is known, one of the needs which has always been mostly felt by the producers of articles made of plastics material, and in particular by producers of lenses for glasses, is the need of marking their products, both to distinguish each article within their own production lines and to provide clients with "customized" products with a logo or mark chosen by the clients themselves.

In order to satisfy this need, several techniques have been proposed in the art, all essentially based on making marks printed or engraved on the external surface of the substrate.

However, these techniques have not proved entirely satisfactory, as the logo or pattern marked on the lens and visible to the naked eye, may not only result to be aesthetically poorly attractive, but can also in some cases alterate the optical performances of the lens in the zone nearby the mark.

Besides, the printing or engraving techniques are often troublesome and difficult to control, with a remarkable increase in production costs.

In order to try to obviate somehow these drawbacks, the use of fluorescent dyes to form marks visible only when the substrate is lit with ultraviolet rays has been proposed, as is described, for example in Japanese Patent JP 60023092 or U.S. Pat. No. 4,257,692.

Although these techniques have allowed to make a logo or mark not visible under the normal use conditions of the articles so marked, improving both the aesthetical characteristics and the optical quality of the latter, their realization is anyhow delicate and difficult to control.

Besides, the marks so obtained may be visualized only by means of special lighting devices that are not usually available to the public.

As an alternative solution, it has been proposed to form marks that may be visualized by moisture condensation on the substrate, for instance by breathing thereon, as is described, for example, in European patent EP 0 031 633.

In this case, the mark is formed by causing a zone having a prefixed pattern of the substrate—precisely a zone intended to constitute the mark—to be more hydrophilic that the surrounding ones, so that by breathing thereon the surface of the substrate is fogged except for a pre-defined portion forming the desired mark.

According to such patent, the wanted improved characteristics of water affinity (hydrophily) of the zones forming the mark are achieved by applying to the same a concentrated solution of sulfuric acid.

Even though this technique allows to make marks identifiable by simply breathing over, the same is however substantially limited to substrates without any colouring either on the surface or in mass.

In fact, it has been found that sulfuric acid irreversibly alterates substantially all the traditional organic dyes used for colouring the plastics materials used in the optical sector.

Besides, the application of concentrated solutions of sulfuric acid—notoriously corrosive and to be cautiously handled—is not easy and not without risks for the operator.

DISCLOSURE OF INVENTION

According to the present invention, it has surprisingly been found that it is possible to form on a substrate made of plastics material, optionally mass-coloured or surface-coloured, a mark not visible under the usual use conditions, but which may be visualized whenever the substrate is fogged, by applying a basic solution to a portion having a prefixed pattern of the same.

According to a first aspect, the present invention provides a method of forming a mark on a substrate made of plastics material, characterized in that it comprises the step of applying a basic solution to a surface portion having a prefixed pattern of said substrate.

According to the invention, in fact, it has been observed that a suitably concentrated basic solution may hydrolize in a controlled manner the polymer chains that form the matrix of the substrate or the external layer optionally present on the same, forming hydrophilic groups that can reversibly bind water molecules.

According to a preferred embodiment, the surface portions of the substrate which undergo such hydrolitic attack may advantageously be defined in the shape of indicia reproducing a logo or a mark.

To the naked eye and in the absence of humidity, the substrates treated according to this invention do not show any visible sign of the mark formed on their external surface.

However, the so formed logo or mark becomes immediately and clearly recognizable by fogging the substrate, such as for instance, by breathing on the same.

In such case, in fact, the substrate is uniformely fogged, except for the zones forming the mark, which zones—being highly hydrophilic due to the surface hydrolysis treatment undergone—may bind a greater amount of humidity and consequently appear essentially transparent.

The visualization by fogging of the mark is fully reversible and generally disappears within a few seconds under room temperature and humidity conditions.

Repeated tests carried out have shown that the marks obtained according to the method of the invention remain substantially unalterated for a long time and in spite of repeated mechanical actions of soap-washing and/or wiping.

In the following description and in the appended claims, the term: basic solution, is used to indicate an aqueous solution of any basic compound that may release OH$^-$ ions in solution.

Preferably, said basic compound is an inorganic base selected from the group comprising the hydroxides of alkaline or alkaline-earth metals of the IA and IIA groups of the periodic system and, in particular, sodium hydroxide [NaOH], potassium hydroxide [KOH] or barium hydroxide [Ba(OH)$_2$] in aqueous solution.

Although any basic solution may be used to form the desired indicia, it is preferable to use solutions in which the concentration of the basic coumpound is at least equal to 0.01 mol/l.

Preferably, the concentration of the basic coumpound is between 0.01 and 6 mol/l.

According to the invention, furthermore, the basic solution applied to the substrate is kept at a temperature preferably ranging from 20° to 100° C.

Under 20° C., in fact, it has been found that treatment times increase up to values such as to cause the method to be uselessly slow and of little practical importance from an industrial point of view.

On the contrary, temperatures higher than 100° C. involve the risk of irreversibly degrading the surface of the substrate.

Therefore, in a preferred embodiment, the temperature of the basic solution is kept at a value of from room temperature to 60° C.

Generally, the time necessary to complete the hydrolysis treatment of the substrate surface, forming highly hydrophilic zones which may be visualized by breathing over, results to be inversely proportional to both the concentration of the basic compound and the temperature of the basic solution used.

The higher the concentration of the basic compound in the used solution, the lower are both the treatment time and the life of the so formed mark in the same temperature conditions.

Conversely, the higher the temperature of the used solution, the lower are both the treatment time and the life of the so formed mark at the same concentration of the basic compound.

So, for example, in the case of solutions wherein the basic compound concentration ranges within the preferred values (0.01–6 mol/l), treatment times may vary—working at room temperature—from a minimum of 30 seconds, using solutions having a concentration of 6 mol/l, to a maximum of 12 hours, using solutions having a concentration of 0.01 mol/l.

Clearly, the most suitable treatment time to form a lasting mark on the substrate without degrading its surface characteristics, may be determined by those skilled in the art according to the concentration of the basic compound and the temperature of the basic solution.

According to the invention, the mark may be formed on the surface of the substrate by using a plurality of application techniques.

For example, the basic solution may be applied to the substrate by any porous means impregnated with the solution or by using a brush or also by coating the surface with a protective film having a pattern matching the one of the mark and dipping in or spraying with said solution the coated substrate.

After having kept the basic solution in contact with the substrate for a time sufficient to mark at least a surface portion thereof, the method of the invention preferably comprises a subsequent step of removing the basic solution, which step may be carried out by dripping and water-washing or only water-washing, depending upon the application technique followed.

If the substrate is colourless and susceptible of subsequent dyeing, the step of removing the basic solution may be advantageously carried out by direct immersion in a dyeing bath.

According to the invention, any substrate made of plastics material comprising polymer chains susceptible of hydrolytic attack causing formation of hydrophilic groups may be marked with the method described hereinabove.

Preferably, the substrate comprises a polymer selected from the group comprising: polymethylmethacrylate, polycarbonate, polyolallyl carbonates, cellulose esters, polyacrylates, and saturated and unsaturated polyurethanes and polyesters.

Among them, diethylenglycol-bis-allyl-carbonate or CR 39®—commonly used for manufacturing glass lenses, either ophthalmic or not—is preferred.

Besides, according to the invention, the polymer matrix may be constituted either by one of the above polymers or by polymer(s) making part of a layer, having for instance anti-scrath properties, applied on the substrate.

Preferably, such layer comprises a film obtained by cross-linking a polymer selected from the group comprising: polysiloxane resins and polyurethane resins.

By way of indication only, commercially available polysiloxane resins which may be used for the purpose are those described in US patents 4,225,631 and 4,503,126, as well as in European patent application EP 0 171 493.

According to a particularly advantageous embodiment, the method of the invention provides the step of applying a composition comprising said basic solution and at least a water-soluble compatible polymer, i.e. a polymer stable in an alkaline medium, to a portion of the substrate having a prefixed pattern.

According to a further aspect, the present invention therefore provides the use of a basic composition comprising a basic solution and at least a water-soluble polymer for forming a mark on at least a surface portion of a substrate made of plastics material.

The basic composition of the invention has the aspect of a viscous and homogeneous liquid wherein the water-soluble polymer acts as a supporting and carrying agent of the free hydroxyl groups present in the composition.

Advantageously, the viscosity of the so obtained composition may be suitably adjusted up to values such as to cause the composition, once it has been applied, to remain substantially adherent to the substrate, without the help of external means.

In this way, it is possible to obtain marks having a sharp and well defined profile, and to adopt application techniques, such as, for instance, transfer stamping, punching, pad-printing or silk-screen printing, than can be carried out in a quick, repeatable and economical manner with high-automation apparatuses available on the market.

Preferably, the dynamic viscosity of the composition, measured at 23° C. and 60 rpm, is adjusted to values ranging from 2,000 to 10,000 mPa×s, and preferably between 2,500 and 7,000 mPa×s.

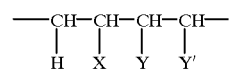

wherein X is independently H, OH, COOH, OR or an acyl group R'CO, R is an aliphatic group having 1 to 4 carbon atoms or a benzenic group and R' is an aliphatic group having 1 to 4 carbon atoms, Y is independently H or COOH and Y' is independently OH, COOH or an acyl group R'CO as defined above.

Examples of water-soluble polymers of the invention are those in which said monomeric unit is the following:

a) X=OH, Y=H and Y'=OH;
b) X=OR, Y=Y'=COOH
c) X=COOH, Y=H and Y'=COOH;
d) X=H, Y=Y'=COOH;
e) X=Y'=OR' and/or OH in a random way and Y=H.

Among them, preferred water-soluble polymers are those selected from the group comprising: optionally hydrolysed polyvinyl alcohols; copolymers of maleic anhydride with vinylethers, vinyl esters, acrylic acids or olefins; polyacrylic acid as such or as sodium salt; water-soluble polymers and copolymers of methacrylic acid; water-soluble polymers and copolymers of vinyl ethers; water-soluble polyesters and polyethers; water-soluble cellulose derivatives, such as, for example, methyl- and/or ethylcellulose; water-soluble urea-formaldehyde and/or melamine resins, and functional derivatives thereof, such as, for example, the corresponding methylated resins; water-soluble phenol-formaldehyde resins; and mixtures thereof.

Still more preferably, the water-soluble polymer is selected from the group comprising: maleic anhydride/methylvinyl ether copolymers and sodium salts thereof; maleic anhydride/acrylic acids copolymers and sodium salts thereof, in particular those having a mean molecular weight equal to at least 70,000; polyacrylic acid; polyvinyl alcohol having an hydrolysis degree greater than 80% and a mean molecular weight greater than 80,000.

In an embodiment of the invention, polyvinyl alcohols may be advantageously formulated in hydroalcoholic solution, meaning by this term a homogeneous water/alcohol mixture in any volume ratio.

Preferred hydroalcoholic solutions comprise homogeneous mixtures of up to 50/50 v/v of water with an alcohol selected from the group comprising aliphatic alcohols having 1 to 4 carbon atoms and aromatic alcohols.

For the purposes of the invention, preferred alcohols are those selected from the group comprising: methyl, ethyl, isopropyl, n-butyl alcohol, and mixtures thereof.

Preferably, the liquid composition of the invention is prepared according to a process comprising the steps of providing an aqueous or, optionally, hydroalcoholic solution of at least one water-soluble polymer stable in an alkaline medium, and of adding a basic compound in powder or pellets to said solution.

In this way, the desired concentration of basic compound (hydrolysing agent) may be reached, starting from commonly available polymer compositions, by gradually adding thereto the basic compound.

Preferably, the basic compound is solubilized in the polymer composition maintaining the latter under constant stirring and optionally cooling, so as to control in the best way the temperature of the resulting composition.

Alternatively, the liquid composition of the invention may be prepared according to a process comprising the steps of providing an aqueous solution of at least one basic compound, and of adding at least one water-soluble polymer, optionally in hydroalcoholic solution, stable in alkaline medium, to said aqueous solution.

Whatever is the preparation process, optimum results have been achieved when the concentration of the basic compound in the liquid composition ranges from 2 to 6 mol/l and the dynamic viscosity of the composition, measured at 23° C. and 60 rpm, is between 2,500 and 7,000 mPa×s.

In this case, in fact, the composition may be effectively applied by transfer stamping, forming a mark having a sharp and well defined contour, particularly valuable from the aesthetic point of view.

MODES FOR CARRYING OUT THE INVENTION

Further characteristics and advantages of the invention will be better apparent from the following description of some embodiments of the invention, given hereunder by way of non limitative illustration.

In all of the following examples, the various compositions will be defined by indicating the parts by weight of each component, unless otherwise specified.

EXAMPLE 1

12 g of NaOH in pellets were added to 100 g of an aqueous solution at 60% by weight of a commercially available maleic anhydride/methylvinylether copolymer (Sokalan® CP 2 produced by BASF), having a viscosity of about 5,000 mPa×s, obtaining a basic liquid composition of the same viscosity, having a NaOH concentration of about 2.5 mol/l.

Such a composition was then applied at room temperature (25° C.) in the form of letter "O" having a size of about 18 mm×18 mm, by means of a pad-printing technique and using apparatuses known in the art, onto the central portion of the convex surface of a set of 20 sun-glasses lenses made of CR39®, 10 of which colourless and 10 surface grey-dyed.

After the application, the liquid composition was allowed to act for about 12 hours and thereafter removed by rinsing with running water.

All of the so treated lenses, either coloured or colourless, resulted—to all apperances—to be fully identical to non treated lenses; however, by breathing over them, the "O"-shaped transparent mark could be seen, surrounded by a zone fogged in a substantially uniform manner.

Besides, on the coloured lenses no colour loss or alteration could be noticed in the marked zone.

After repeated water-and-soap washings and after a 30-days air exposure, no sharpness loss of the mark could be noticed.

EXAMPLE 2

The procedure described in preceding Example 1 was repeated on a set of 20 sun-glasses lenses made of polycarbonate, 10 of which colourless and 10 grey-dyed in mass. All the lenses had an anti-scratch surface layer constituted by a polysiloxane resin of conventional type.

Also in this case an "O"-shaped mark having a size of about 18 mm×18 mm was formed on the lenses. All the treated lenses, either couloured or coulourless, resulted—to all apperances—to be fully identical to non treated lenses; however, by breathing over them, it was possible to visualize the "O"-shaped transparent mark, surrounded by a zone fogged in a substantially uniform manner.

Besides, on the coloured lenses no colour loss or alteration could be noticed in the marked zone.

After repeated water-and-soap washings and after a 30-days air exposure, no sharpness loss of the mark could be observed.

EXAMPLE 3

The procedure described in preceding Example 1 was repeated on a set of 20 sun-glass lenses made of methacrylate, 10 of which colourless and 10 grey-dyed in mass. All the lenses had an anti-scratch surface layer constituted by a polysiloxane resin of conventional type.

Also in this case marks were obtained that had properties entirely similar to those described in the preceding Examples 1 and 2.

EXAMPLE 4

On a set of 20 sun-glasses lenses made of CR39®, 10 of which colourless and 10 grey-dyed, a protection film was applied from plasticized PVC, so as to form a "T"-shaped unprotected zone.

The lens were then dipped in a KOH aqueous solution having a concentration of about 2 mol/l, and a temperature of of about 60° C.

After a period of about 5 minutes, the lenses were extracted and rinsed with running water, so as to eliminate any basic solution residue.

Afterwards, a "T"-shaped transparent mark, surrounded by a fogged zone, could be visualized by breathing over upon removal of the protective film.

All of the so treated lenses, either coloured or colourless, resulted be fully identical to non treated lenses; also in this case, on the coloured lenses no colour loss or alteration could be noticed in the marked zone.

After repeated water-and-soap washings and after a 30-days air exposure, the visualization technique by breathing over was repeated, and no sharpness loss of the mark could be observed.

EXAMPLE 5

30 g of commercially available polyvinyl alcohol, having a hydrolysis degree equal to 88% and a molecular weight of about 88,000, were dissolved in a homogeneous mixture comprising 300 cm³ of water and 200 cm³ of ethanol.

30 g of NaOH in pellets were then added to the resulting mixture, causing a progressive dissolution of the same under constant stirring and at a temperature of about 60° C.

In this way a basic liquid composition, having a viscosity of about 7,000 mPa×s and a NaOH concentration of about 1.5 mol/l, was obtained which was then applied by transfer stamping onto the central portion of 20 sun-glasses lenses made of CR39®.

The composition was applied to an "A"-shaped zone by means of a suitably shaped applicating pad.

The so treated lenses were then allowed to rest for about 12 hours at room temperature and thereafter washed with running water to remove the composition from the surface of the lenses.

By breathing on the lenses, an "A"-shaped transparent mark could be seen surrounded by a fogged zone.

After repeated water-and-soap washings and after a 30-days air exposure, the visualization technique by breathing over was repeated, and no sharpness loss of the mark could be observed.

EXAMPLE 6

The procedure described in preceding Example 5 was repeated, applying the liquid composition by means of a silk-screen.

Both at the end of the application procedure and after repeated washings and air exposures no significant difference could be noticed compared to the marks obtained with the other application techniques.

From what has been described and illustrated hereinabove, the numerous advantages achieved by the invention are evident.

Among them, it should be remarked that the application techniques required for forming marks visible by fogging any substrate made of plastics material, either coloured or not, are extremely simple and reproducible.

Besides, the liquid composition of the present invention allows to use highly automated application techniques, such as for example pad-printing, with a drastic reduction in times and costs necessary for the application of the desired indicia.

Lastly, the liquid composition of the invention allows to form marks having the most varied patterns and sizes, by simply adopting a suitably shaped pad or, alternatively, a silk-screen, without any significant increase in production costs.

What is claimed is:

1. A method of forming a mark on a substrate made of a plastics material, said mark being visible only by condensation of moisture on the substrate, comprising the step of applying a basic solution having a concentration of a basic compound to a surface portion of said substrate having a shape corresponding to the shape of the mark to be formed thereon, said step being carried out for a time and at a temperature adapted to hydrolyze the surface portions of the substrate exposed to said basic solution.

2. A method according to claim 1, wherein said basic solution is from 0.01 to 6 mol/l.

3. A method according to claim 1, wherein said basic compound is an inorganic base selected from the group consisting of hydroxides of alkaline metals or alkaline-earth metals.

4. A method according to claim 1, wherein said inorganic base is selected from the group consisting of: NaOH, KOH, $Ba(OH)_2$ and mixtures thereof.

5. A method according to claim 1, wherein said basic solution further comprises at least one water-soluble polymer stable in an alkaline medium.

6. A method according to claim 5, wherein said basic solution has a dynamic viscosity at 23° C. of from 2,000 to 10,000 mPa×s.

7. A method according to claim 5, wherein said at least one water-soluble polymer is selected from the group consisting of polymers and/or copolymers having the following monomeric unit:

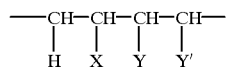

wherein X is independently H, OH, COOH, OR or an acyl group R'CO, R is an aliphatic group having 1 to 4 carbon atoms or a benzenic group and R' is an aliphatic group having 1 to 4 carbon atoms, Y is independently H or COOH and Y' is independently OH, COOH or an acyl group R'CO as defined above.

8. A method according to claim 7, wherein said at least one water-soluble polymer is selected from the group consisting of: optionally hydrolysed polyvinyl alcohols; copolymers of maleic anhydride with vinylethers, vinyl esters, acrylic acids or olefins; polyacrylic acid as such or as sodium salt; water-soluble polymers and copolymers of methacrylic acid; water-soluble polymers and copolymers of vinyl ethers; water-soluble polyesters and polyethers; water-soluble cellulose derivatives; water-soluble urea-formaldehyde and/or melamine resins, and functional derivatives thereof; water-soluble phenol-formaldehyde resins; and mixtures thereof.

9. A method according to claim 8, wherein said at least one water-soluble polymer is selected from the group consisting of: maleic anhydride/methylvinyl ether copolymers; maleic anhydride/acrylic acids copolymers; polyacrylic acid; polyvinyl alcohol having a hydrolysis degree greater than 80% and a mean molecular weight greater than 80,000 and salts thereof.

10. A method according to claim 1, wherein said substrate made of plastics material is selected from the group consisting of: polymethyl methacrylate, polycarbonate, polyalallyl carbonates, cellulose esters, polyacrylates, polyurethanes, saturated and unsaturated polyesters.

11. A method according to claim 1, wherein the step of applying the basic solution to said substrate made of plastics material is carried out at a temperature of from 20° to 100° C.

12. A method according to claim 1, wherein said basic solution is removed from the substrate by water-washing or dipping into a dyeing bath at the end of said step of applying the basic solution.

13. A method according to claim 1, wherein said basic solution is applied to said surface portion of the substrate by transfer stamping, punching, pad-printing or silk-screen printing.

14. A method according to claim 1, wherein said basic solution is applied to said surface portion of the substrate by covering the remaining surface of the substrate with a protection film and by dipping in or spraying the substrate with said solution.

* * * * *